(12) United States Patent
Chen

(10) Patent No.: US 12,536,330 B2
(45) Date of Patent: Jan. 27, 2026

(54) DATA ANONYMIZATION METHOD AND APPARATUS, AND STORAGE SYSTEM

(71) Applicant: HUAWEI TECHNOLOGIES CO., LTD., Guangdong (CN)

(72) Inventor: Keyun Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 18/344,148

(22) Filed: Jun. 29, 2023

(65) Prior Publication Data

US 2023/0342494 A1 Oct. 26, 2023

Related U.S. Application Data

(63) Continuation of application No. PCT/CN2021/142429, filed on Dec. 29, 2021.

(30) Foreign Application Priority Data

Dec. 30, 2020 (CN) .......................... 202011611396.5

(51) Int. Cl.
*G06F 21/00* (2013.01)
*G06F 21/62* (2013.01)

(52) U.S. Cl.
CPC ................ *G06F 21/6254* (2013.01)

(58) Field of Classification Search
CPC .. G06F 21/6254; G06F 3/0623; G06F 3/0661; G06F 21/6272; G06F 2221/034; G06F 3/067; G06F 21/78; G06F 21/84; G06F 21/6245
See application file for complete search history.

(56) References Cited

U.S. PATENT DOCUMENTS

| | | |
|---|---|---|
| 8,682,910 B2 | 3/2014 | Fu et al. |
| 2008/0270370 A1 | 10/2008 | Castellanos et al. |
| 2010/0192220 A1 | 7/2010 | Heizmann et al. |
| 2017/0026343 A1* | 1/2017 | Wardman ............ H04L 63/0421 |
| 2018/0004978 A1 | 1/2018 | Hebert et al. |
| 2019/0066830 A1* | 2/2019 | Kumar .................. G16H 20/10 |
| 2020/0065521 A1* | 2/2020 | Durvasula ........... H04L 63/0421 |

(Continued)

FOREIGN PATENT DOCUMENTS

| | | |
|---|---|---|
| CN | 109409121 A | 3/2019 |
| CN | 110188565 A | 8/2019 |
| CN | 110795756 A | 2/2020 |

OTHER PUBLICATIONS

Cai et al., "Collective Data-Sanitization for Preventing Sensitive Information Inference Attacks in Social Networks", IEEE Transactions on Dependable and Secure Computing, vol. 15, No. 4, Jul./Aug. 2018.*

(Continued)

*Primary Examiner* — Morshed Mehedi
(74) *Attorney, Agent, or Firm* — Fish & Richardson P.C.

(57) ABSTRACT

The present disclosure relates to data anonymization methods, apparatuses, and storage systems. In one example method, a storage system obtains a data access request, obtains target data based on the data access request, and performs anonymization processing on the target data to obtain anonymized target data. Then, the storage system sends the anonymized target data.

19 Claims, 5 Drawing Sheets

(56) References Cited

U.S. PATENT DOCUMENTS

2020/0394462 A1* 12/2020 Hild .................... G06F 11/0754
2021/0026989 A1* 1/2021 Aiello ................. G06F 21/6254

OTHER PUBLICATIONS

Aitzhan et al., "Security and Privacy in Decentralized Energy Trading Through Multi-Signatures, Blockchain and Anonymous Messaging Streams", IEEE Transactions on Dependable and Secure Computing, vol. 15, No. 5, Sep./Oct. 2018.*
Domingo-Ferrer et al., "Database Anonymization:Privacy Models, Data Utility, and Microaggregation-based Inter- model Connections," Synthesis Collection of Technology, Jan. 2016, 125 pages.
Extended European Search Report in European Appln No. 21914490. 4, dated May 21, 2024, 8 pages.
International Search Report and Written Opinion in International Appln. No. PCT/CN2021/142429, mailed on Mar. 11, 2022, 15 pages (with English translation).

* cited by examiner

DATA ANONYMIZATION METHOD AND APPARATUS, AND STORAGE SYSTEM

CROSS-REFERENCE TO RELATED APPLICATIONS

This application is a continuation of International Application No. PCT/CN2021/142429, filed on Dec. 29, 2021, which claims priority to Chinese Patent Application No. 202011611396.5, filed on Dec. 30, 2020. The disclosures of the aforementioned applications are hereby incorporated by reference in their entireties.

TECHNICAL FIELD

This application relates to the field of computer technologies, and in particular, to a data anonymization method and apparatus, and a storage system.

BACKGROUND

In an Internet technology (IT), a development node may test production system data as test sample data, to make a business decision based on a test result. The production system data is stored in a storage system. The production system data includes of enterprise service sensitive information or user personal sensitive information. Therefore, before the production system data is used as the test sample data, anonymization processing needs to be performed on the production system data stored in the storage system. In the current technology, data anonymization processing is performed by another host on data stored in a storage system, which increases anonymization costs and leads to low anonymization efficiency.

SUMMARY

This application provides a data anonymization method and apparatus, and a storage system, to resolve problems of high anonymization costs and low anonymization efficiency when anonymization processing is performed on production system data.

To achieve the foregoing objectives, the following technical solutions are used in this application.

According to a first aspect, this application provides a data anonymization method. A storage system obtains a data access request, obtains target data based on the data access request, and performs anonymization processing on the target data to obtain anonymized target data. Then, the storage system sends the anonymized target data.

In this way, the storage system performs anonymization processing on stored production system data, and another host does not need to perform anonymization processing, thereby reducing costs. In addition, the storage system supports real-time anonymization and directly sends production system data obtained through anonymization processing to the development node. This reduces anonymization delay and improves anonymization efficiency.

Optionally, in a possible implementation of this application, the foregoing method for "the storage system performs anonymization processing on the target data to obtain anonymized target data" may include: The storage system performs anonymization processing on sensitive information in the target data based on a sensitive parameter to obtain the anonymized target data. The sensitive parameter indicates sensitive information in the target data.

Optionally, in another possible implementation of this application, before the storage system performs anonymization processing on the target data to obtain anonymized target data, the data anonymization method provided in this application may further include: The storage system loads the target data to an anonymization environment.

In this way, the anonymization environment is created and the target data is loaded to the anonymization environment to prepare for data anonymization.

Optionally, in another possible implementation of this application, the anonymization environment is a container or a virtual machine running in the storage system.

Optionally, in another possible implementation of this application, the data anonymization method provided in this application may further include: The storage system determines the sensitive parameter of the target data.

In this way, anonymization processing can be performed on the target data in the anonymization environment of the storage system. Compared with anonymization processing performed by another node, the anonymization processing is more convenient and flexible, and costs are reduced.

Optionally, in another possible implementation of this application, the data access request includes target account information. The data anonymization method provided in this application may further include: The storage system determines an anonymization rule based on the target account information. In this scenario, the method for "the storage system performs anonymization processing on the target data to obtain anonymized target data" may include: The storage system performs anonymization processing on the target data according to the anonymization rule to obtain the anonymized target data.

In this way, the anonymization rule is determined based on the account information, so that anonymization requirements of different accounts can be met. When the storage system performs real-time anonymization, different accounts access the same data, and a corresponding anonymization rule can be determined based on the account information, which implements multiple accesses to a piece of data, and improves anonymization efficiency.

Optionally, in another possible implementation of this application, the method for "the storage system determines an anonymization rule based on the target account information" may include: The storage system determines a target sensitive parameter based on the target account information, and determines the anonymization rule based on the target sensitive parameter. The sensitive parameter of the target data includes the target sensitive parameter.

Optionally, in another possible implementation of this application, the method for "the storage system performs anonymization processing on the target data according to the anonymization rule to obtain the anonymized target data" may include: If the anonymization rule includes a first anonymization rule, anonymization processing is performed on the target data in the link by using the first anonymization rule to obtain the anonymized target data. The link refers to a link after the target data is obtained from the hard disk and before the anonymized target data is sent. If the anonymization rule includes a second anonymization rule, anonymization information is generated based on the second anonymization rule, and anonymization processing is performed on the target data in the hard disk by using the anonymization information to obtain the anonymized target data. The anonymization information includes an anonymization script or an anonymization structured query statement.

The storage system supports different types of anonymization, which can meet the anonymization requirements of different accounts.

Optionally, in another possible implementation of this application, the data anonymization method provided in this application may further include: The storage system obtains an access delay of the target data, and adjusts a quality of service parameter of the target data based on the access delay. The access delay is a delay from the time when the data access request is received to the time when the anonymized target data is sent.

In this way, the QoS parameter of the target data is adjusted in real time, so that the target data meets an anonymization requirement.

Optionally, in another possible implementation of this application, the data access request includes target account information. The method for "the storage system obtains target data based on the data access request" may include: When determining that the authentication on the target account information succeeds, the storage system obtains the target data based on the data access request.

According to a second aspect, a data anonymization apparatus is provided, where the data anonymization apparatus is located in a storage system, and the data anonymization apparatus includes modules configured to perform the data anonymization method according to any one of the first aspect or the possible implementations of the first aspect.

According to a third aspect, a storage system is provided. The storage system includes a memory and a processor. The memory is coupled to the processor. The memory is configured to store computer program code, and the computer program code includes computer instructions. When the processor executes the computer instructions, the storage system performs the data anonymization method according to any one of the first aspect and the possible implementations of the first aspect.

According to a fourth aspect, a chip system is provided, and the chip system is applied to a storage system. The chip system includes one or more interface circuits and one or more processors. The interface circuit and the processor are interconnected by using a line. The interface circuit is configured to receive a signal from a memory of the storage system, and send the signal to the processor, where the signal includes the computer instructions stored in the memory. When the processor executes the computer instructions, the storage system performs the data anonymization method according to any one of the first aspect and the possible implementations of the first aspect.

According to a fifth aspect, a computer-readable storage medium is provided. The computer-readable storage medium includes computer instructions. When the computer instructions are run on a storage system, the storage system is enabled to perform the data anonymization method according to any one of the first aspect and the possible implementations of the first aspect.

According to a sixth aspect, this application provides a computer program product. The computer program product includes computer instructions. When the computer instructions are run on a storage system, the storage system is enabled to perform the data anonymization method according to any one of the first aspect and the possible implementations of the first aspect.

For specific descriptions of the second aspect to the sixth aspect and the implementations of the second aspect to the sixth aspect in this application, refer to the detailed descriptions of the first aspect and the implementations of the first aspect. In addition, for beneficial effects of the second aspect to the sixth aspect and various implementations of the second aspect to the sixth aspect, refer to the analysis of beneficial effects of the first aspect and various implementations of the first aspect. Details are not described herein again.

These aspects or other aspects of this application are simpler and easier to understand in the following description.

DESCRIPTION OF EMBODIMENTS

In this application, words such as "example" or "for example" are used to represent examples, illustrations, or descriptions. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments of this application, unless otherwise stated, "a plurality of" means two or more than two.

Data anonymization is to modify sensitive information according to an anonymization rule to ensure reliable protection of sensitive information. For example, sensitive information may include: information such as an ID number, a phone number, or a bank card number. There are a plurality of types of anonymization, for example, a first anonymization, a second anonymization, and the like. When anonymization processing is performed on data, processing operations of different types of anonymization may be different. For example, the first anonymization is to anonymize data in a link by using an anonymization rule, and the link refers to a link after data is obtained from a hard disk and before data obtained through anonymization processing is sent. The second anonymization is to first generate anonymization information according to the anonymization rule, where the anonymization information includes an anonymization script or an anonymization structured query statement, and then the data in the hard disk is anonymized by using the anonymization information.

The production system data includes sensitive information. Therefore, before other nodes use the production system data, anonymization processing needs to be performed on the production system data in the storage system. To ensure that the production system data is not damaged, the storage system further stores replica data of the production system data. During anonymization, the replica data of the production system data is usually processed.

Figure 1:
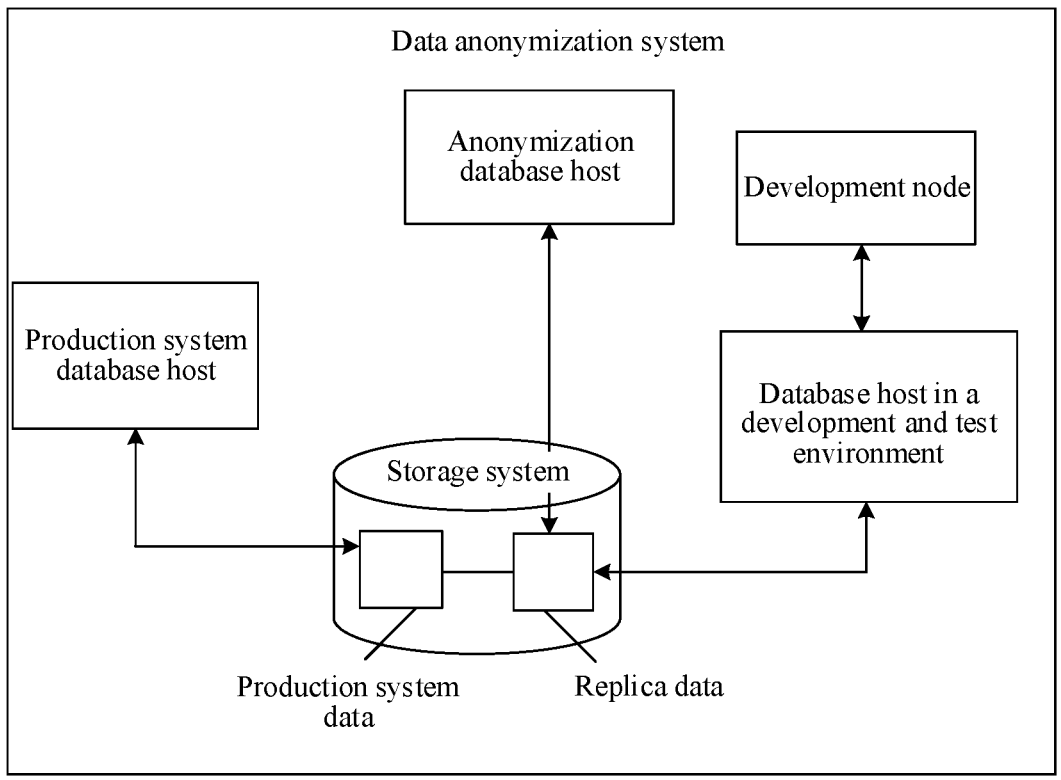
FIG. 1 is a schematic diagram 1 of a data anonymization system according to the current technology.

Related technologies provide two methods for performing anonymization processing on the replica data of the production system data. As shown in FIG. 1, in a solution of a related technology 1, an anonymization database host performs anonymization processing on the replica data of the production system data. Specifically, the anonymization database host anonymizes the replica data of the storage system by using an anonymization script, and then the storage system transmits the anonymized data to a database host in a development and test environment. The development node accesses replica data obtained through anonymization processing of the database host in the development and test environment and uses the replica data as the test sample data for testing. A rule in which anonymization processing is performed on replica data by using an anonymization script is referred to as a first anonymization rule.

Figure 2:
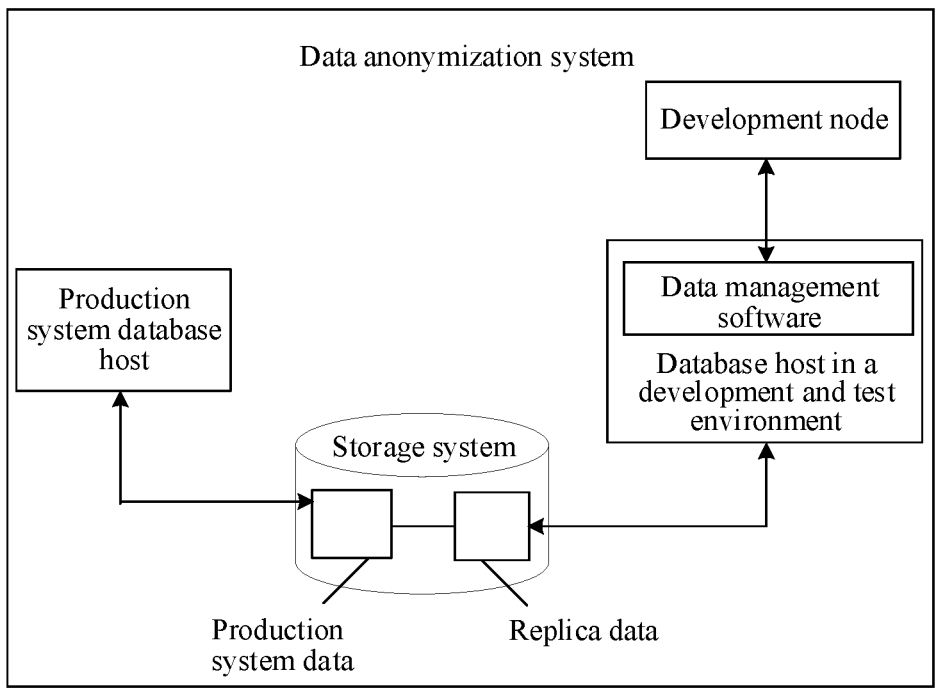
FIG. 2 is a schematic diagram 2 of a data anonymization system according to the current technology.

As shown in FIG. 2, in a solution of a related technology 2, a database host in a development and test environment obtains replica data of production system data from a storage system, and when a development node accesses the database host in the development and testing environment in real time, a data management software installed by the database host in the development and test environment performs anonymization processing on the replica data of the production system data. Replica data obtained through anonymization processing is transferred to the development node, which facilitates the development node to make a testing. A rule in which anonymization processing is performed on replica data by using software is referred to as a second anonymization rule.

In the foregoing two solutions, anonymization processing is performed by an anonymization database host or anonymization processing is performed by a database host in a development and test environment, which increases anonymization costs and leads to low anonymization efficiency.

To resolve the foregoing technical problem, embodiments of this application provide a data anonymization method and apparatus, and a storage system. Anonymization processing is performed on production system data by using a computing capability of the storage system, to reduce anonymization costs. In addition, the storage system directly sends production system data obtained through anonymization processing to a development node. Compared with the current technology in which the development node may be accessed only by using a database host in a development and test environment, an anonymization delay may be reduced, thereby improving anonymization efficiency.

Figure 3:
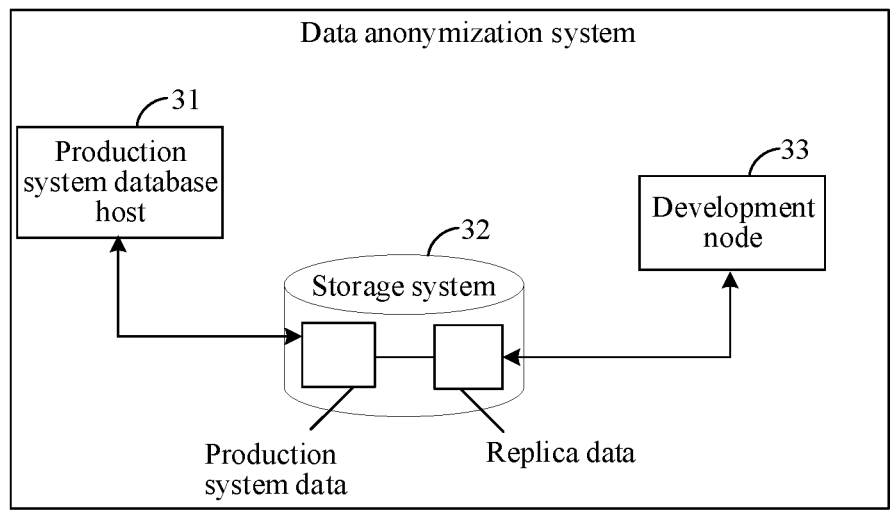
FIG. 3 is a schematic diagram of a data anonymization system according to an embodiment of this application.

The data anonymization method provided in embodiments of this application is applicable to a data anonymization system. FIG. 3 shows a structure of the data anonymization system. As shown in FIG. 3, the data anonymization system may include: a production system database host 31, a storage system 32, and a development node 33. The production system database host 31 establishes a connection to the storage system 32 in a wired communication manner or a wireless communication manner, and the storage system 32 establishes a connection to the development node 33 in a wired communication manner or a wireless communication manner.

The production system database host 31 is configured to generate production system data.

The storage system 32 is configured to obtain the production system data from the production system database host 31, and store the production system data and replica data of the production system data. The storage system 32 is further configured to obtain, after receiving a data access request from the development node 33, target data from the replica data based on the data access request, perform anonymization processing on the target data to obtain anonymized target data, and send the anonymized target data to the development node 33.

In some embodiments, the storage system 32 may include one server, or may be a server cluster including a plurality of servers, or may be a cloud computing service center, or may be a storage array. A specific form of the storage system 32 is not limited herein in embodiments of this application.

The development node 33 is configured to send the data access request to the storage system 32, and is further configured to receive the anonymized target data sent by the storage system 32, and test the anonymized target data as test sample data, to make a business decision based on a test result.

In some embodiments, the development node 33 may be a terminal device. The terminal device may be a mobile phone (mobile phone), a tablet computer, a notebook computer, a palmtop computer, or the like.

Figure 4:
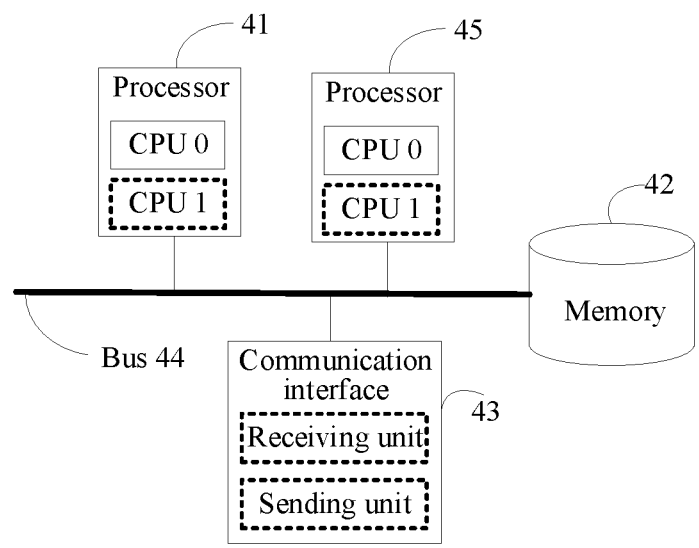
FIG. 4 is a schematic diagram of a structure of a computing apparatus according to an embodiment of this application.

A basic hardware structure of the production system database host 31 is similar to that of the development node 33, and both include elements included in a computing apparatus shown in FIG. 4. The following uses the computing apparatus shown in FIG. 4 as an example to describe hardware structures of the production system database host 31 and the development node 33.

As shown in FIG. 4, the computing apparatus may include a processor 41, a memory 42, a communication interface 43, and a bus 44. The processor 41, the memory 42, and the communication interface 43 may be connected by using the bus 44.

The processor 41 is a control center of the computing apparatus, and may be one processor, or may be a collective name of a plurality of processing elements. For example, the processor 41 may be a general-purpose central processing unit (CPU), or may be another general-purpose processor. The general-purpose processor may be a microprocessor, any conventional processor, or the like.

In an embodiment, the processor 41 may include one or more CPUs, for example, a CPU 0 and a CPU 1 shown in FIG. 4.

In an embodiment, the computing apparatus may include a plurality of processors, for example, the processor 41 and the processor 45 shown in FIG. 4. Each of the processors may be a single-core processor (single-CPU) or may be a multi-core processor (multi-CPU). The processor herein may be one or more devices, circuits, and/or processing cores configured to process data (for example, a computer instruction).

The memory 42 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of an instruction or data structure and capable of being accessed by a computer, but is not limited thereto.

In a possible implementation, the memory 42 may exist independently of the processor 41. The memory 42 may be connected to the processor 41 by using the bus 44, and is configured to store an instruction or program code. When the processor 41 invokes and executes the instruction or program code stored in the memory 42, the data anonymization method provided in the following embodiments of this application can be implemented.

In another possible implementation, the memory 42 and the processor 41 may also be integrated.

The communication interface 43 is configured to connect the computing apparatus to another device by using a communication network. The communication network may be the Ethernet, a radio access network (RAN), a wireless local area network (WLAN), or the like. The communication interface 43 may include a receiving unit configured to receive data and a sending unit configured to send data.

The bus 44 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

It should be noted that the structure shown in FIG. 4 does not constitute a limitation to the computing apparatus. In addition to the components shown in FIG. 4, the computing apparatus may include more or fewer components than those shown in the figure, combine some components, or have different component arrangements.

The storage system 32 may provide logical unit number (LUN) storage or network attached storage (NAS). In addition, the storage system 32 has a function of writable snapshot or clone.

Based on the foregoing descriptions of the structures of the data anonymization system and the computing apparatus, an embodiment of this application provides a data anonymization method. The following describes the data anonymization method provided in this embodiment of this application with reference to the accompanying drawings.

Figure 5:
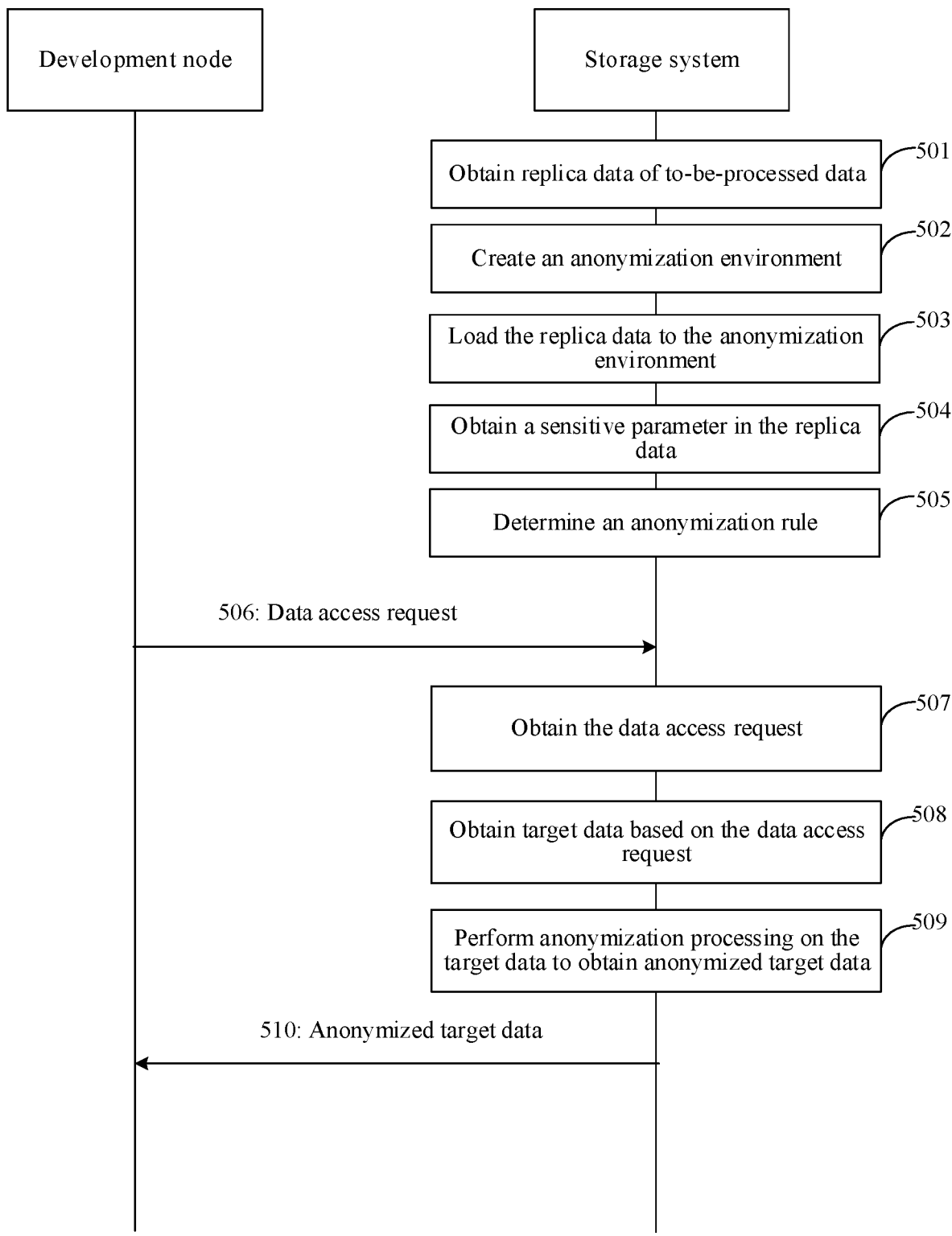
FIG. 5 is a schematic flowchart of a data anonymization method according to an embodiment of this application.

When the data anonymization method is applied to the data anonymization system shown in FIG. 3, as shown in FIG. 5, the data anonymization method may include the following step 501 to step 510. Step 501 to step 505 are a stage in which the storage system prepares for anonymization. Step 506 to step 510 are a stage in which the storage system performs anonymization on data.

501. A storage system obtains replica data of to-be-processed data.

The to-be-processed data may be production system data.

The storage system may obtain the production system data from a production system database host, and store the production system data in a memory of the storage system. When data anonymization is required, the storage system may use a data protection technology, such as a snapshot technology or a backup technology, to create replica data of the production system data, and store the created replica data in the memory of the storage system.

502. The storage system creates an anonymization environment.

In addition to creating the replica data of the production system data, the storage system may further create an anonymization environment based on a performance requirement of a data access request, and allocate corresponding CPU and memory to the anonymization environment. This anonymization environment is configured to anonymize the replica data. The anonymization environment includes a database, and the database is configured to store the production system data.

In some embodiments, the anonymization environment may be specifically a virtual machine, a container, or the like that runs in the storage system. A specific form of the anonymization environment is not limited in this embodiment of this application.

503. The storage system loads the replica data to the anonymization environment.

After creating the replica data of the production system data and creating the anonymization environment, the storage system may load the replica data to the anonymization environment. In addition, the storage system can run the anonymization environment.

In a specific implementation, the storage system may load the replica data from the memory to the anonymization environment by using a mount command.

In this way, the replica data of the to-be-processed data is obtained, and the replica data is processed, to achieve an objective of protecting the data. In addition, an anonymization environment can be created and the replica data is loaded to the anonymization environment to prepare for data anonymization.

504. The storage system obtains a sensitive parameter in the replica data.

In some embodiments, after the replica data is loaded to the anonymization environment, the storage system may obtain an access interface of the anonymization environment, and access the replica data in the anonymization environment by using the access interface.

The replica data is usually stored in a form of a table. The storage system may sample some column names from the replica data, and determine sensitive column names in sampled column names based on a preset rule or an artificial intelligence (artificial intelligence, AI) automatic identification algorithm. Each determined column name is then combined with the storage location (database name, table name) of the column name to form a set of sensitive parameters. The sensitive parameter indicates sensitive information in the replica data.

It may be understood that the access interface of the anonymization environment may be an open database connectivity (ODBC) interface.

505. The storage system determines an anonymization rule.

In some embodiments, after the sensitive parameter in the replica data is obtained, the storage system may search for a preconfigured correspondence, where the correspondence includes a column name and an anonymization rule, and determine an anonymization rule corresponding to each column name in the sensitive parameter. In this way, an anonymization rule corresponding to a sensitive parameter that includes the column name is obtained. There may be one or more anonymization rules, and each anonymization rule uniquely corresponds to one anonymization rule identifier.

In some embodiments, different accounts have different anonymization requirements, for example, different requirements on an anonymization type, different requirements on a rule, or different requirements on sensitive information to be anonymized. Therefore, the storage system may determine the anonymization rule based on account information. In different implementations, the meaning of an anonymization rule may vary.

In a possible implementation, the storage system may determine a corresponding anonymization rule based on the account information, and the anonymization rule may include: sensitive parameters and a processing rule corresponding to each sensitive parameter. For different preset accounts, sensitive parameters included in the anonymization rule may be different. For example, for a newly registered account or an administrator account, sensitive parameters included in the anonymization rule are all sensitive parameters in the replica data. For another account, the sensitive parameter included in the anonymization rule may be a preset sensitive parameter corresponding to each preset account.

In another possible implementation, the storage system may determine a sensitive parameter corresponding to each piece of preset account information, and determine an anonymization rule corresponding to each column name in the sensitive parameter. The preset account information may determine whether the anonymization rule includes a first anonymization rule and a second anonymization rule, or includes only the first anonymization rule, or includes only the second anonymization rule. When the anonymization rule includes both the first anonymization rule and the second anonymization rule, whether the two anonymization rules are the same is determined by the preset account information. This is not limited in this embodiment of this application. For anonymization rules corresponding to the same column name, different accounts can use the same or different anonymization rules. In this way, an anonymization rule corresponding to the sensitive parameter and the account information is determined, so that anonymization requirements of different accounts can be met. When the storage system performs real-time anonymization, different accounts access the same data, and a corresponding anonymization rule can be determined based on the account information, which implements multiple accesses to a piece of data, and improves anonymization efficiency.

It should be noted that, in this embodiment of this application, after obtaining the correspondence between the preset account information, the sensitive parameter (the database name, the table name, and the column name), and the anonymization rule, the storage system may store the correspondence in the anonymization environment.

In some embodiments, when storing the correspondence, the storage system may use a preset data structure, for example, data structures of an index key (key) and an index value (value). The data structures of the index key (key) and the index value (value) may have different implementation forms. For example, the storage system may use the preset account information, the database name, the table name, and the column name as keys, and use the first anonymization rule and the second anonymization rule as values. Alternatively, the storage system may use the preset account information, the database name, and the table name as keys, and use the column name, the first anonymization rule, and the second anonymization rule as values. A specific data structure used by the storage system to store the correspondence is not limited herein in this embodiment of this application.

For example, it is assumed that the preconfigured correspondence is shown in Table 1.

TABLE 1

| Column name | Anonymization rule identifier | Anonymization rule |
|---|---|---|
| Phone number | PhoneNumber_PartMask | XXX -****- XXXX (Mask the fourth digit to the seventh digit) |
|  | PhoneNumber_AllMask | * (All mask) |
| ID card number | ID_PartMask | XXXXXX -**-**- XXXX (Mask date of birth) |
|  | ID_AllMask | * (All mask) |
| . . . | . . . | . . . |

It is assumed that there are two groups of sensitive parameters in the replica data obtained by the storage system. One group includes: a database A, a Table 3, an ID card number. The other group includes: a database A, a Table 3, and a phone number. It is assumed that there are two pieces of preset account information: an account A and an account B.

In this case, the storage system may search Table 1, and determine that the correspondence between the preset account information, the sensitive parameter (the database name, the table name, and the column name), and the anonymization rule is Table 2. As shown in Table 2, the anonymization rule corresponding to the account A, the database A, the Table 3, and the ID card number is partially masked, specifically "Mask the date of birth", and the anonymization rule corresponding to the account B, the database A, the Table 3, and the ID card number is "All mask". The anonymization rule corresponding to the account A, the database A, the Table 3, and the phone number is "Mask the fourth digit to the seventh digit", and the anonymization rule corresponding to the account B, the database A, the Table 3, and the phone number is "All mask".

TABLE 2

| Preset account information | Database name | Table name | Column name | Anonymization rule |
|---|---|---|---|---|
| Account A | Database A | Table 3 | ID Card Number | Mask the date of birth |
| Account B | Database A | Table 3 | ID card number | All mask |
| Account A | Database A | Table 3 | Phone number | Mask the fourth digit to the seventh digit |
| Account B | Database A | Table 3 | Phone number | All mask |

506. A development node sends a data access request to the storage system.

When a developer needs to use the production system data stored in the storage system, the developer can perform a login operation on the development node. The development node generates a data access request in response to the login operation of the developer, and sends the data access request to the storage system.

In some embodiments, the data access request may be a structured query language (SQL) request, for example, a Java database connectivity (JDBC) request.

Optionally, the data access request may include data access information. In some embodiments, the data access information may be a data access address, and is configured to obtain the target data.

Optionally, the data access request may further include target account information. A target account refers to a valid account that is authorized to access the production system data. The target account information and the data access information may be obtained by the development node from the storage system in advance and stored in the development node.

507. The storage system obtains the data access request.

After receiving the data access request sent by the development node, the storage system may obtain the data access request, and parse the data access request to obtain information in the data access request, for example, data access information.

Optionally, in a case that the data access request includes the target account information, the storage system may further obtain the target account information.

508. The storage system obtains target data based on the data access request.

In some embodiments, after the target account information in the data access request is obtained, the storage system may obtain the target data based on the target account information.

In some embodiments, after the data access information in the data access request is obtained, the storage system may obtain the target data based on the data access information. The target data may be all replica data of the storage system, or may be part of the replica data.

Optionally, after the data access information and the target account information that are in the data access request are obtained, the storage system may authenticate the target account information, and obtain the target data based on the data access information when determining that the target account information succeeds in the authentication.

Optionally, in this embodiment of this application, in a scenario in which the storage system loads the replica data to the anonymization environment in step 503, that the storage system obtains the target data may be specifically: The storage system obtains the target data from the replica data in the anonymization environment based on the data access request.

It should be noted that, in this embodiment of this application, an example in which step 501 to step 503 are performed before step 506 is used for description. Certainly, step 501 to step 503 may also be performed after step 506 and before step 508. In this scenario, an anonymization environment needs to be created in real time.

509. The storage system performs anonymization processing on the target data to obtain anonymized target data.

Because the target data includes information such as enterprise service sensitive information or user personal sensitive information, after the target data is obtained, the storage system may perform anonymization processing on the target data. Specifically, the storage system may perform anonymization processing on all data in the target data.

Optionally, in this embodiment of this application, a process in which the storage system performs anonymization processing on the target data may be: The storage system obtains the sensitive parameter in the target data based on the data access information, and performs anonymization processing on the sensitive information in the target data based on the sensitive parameter, to obtain the anonymized target data. The sensitive parameter indicates sensitive information in the target data.

In some embodiments, that the storage system obtains the sensitive parameter in the target data based on the data access information is specifically: After the target data is obtained based on the data access information, the storage system may learn a database name and a table name in which the target data is located. The storage system obtains, by querying the pre-stored correspondence, the column name corresponding to the database name and the table name, to obtain the sensitive parameter in the target data. The sensitive parameter includes a group of parameters, and specifically includes: a database name, a table name, a column name, and the like.

For example, it is assumed that the target data obtained by the storage system is shown in Table 3, and the target data is located in the database A.

TABLE 3

| Name | Height | Weight | ID card number | Phone number | Company/Organization |
|------|--------|--------|----------------|--------------|----------------------|
| XX | 110 | 45 | 123456789123456789 | 12345678912 | Company A |
| XX | 160 | 50 | 147258369147258369 | 14725836914 | Company B |
| XX | 178 | 65 | 135792468135792468 | 13579246813 | Company C |

It is assumed that the storage system finds that column names corresponding to the database A and the Table 3 are the ID card number and the phone number, the sensitive parameter obtained by the storage system includes: two groups of parameters: the database A, the Table 3, and the ID card number, and the database A, the Table 3, and the phone number. The storage system can search for sensitive information: three ID card numbers based on the database A, the Table 3, and the ID card number, and perform anonymization processing on them. In addition, the storage system can search for sensitive information: three phone numbers based on the database A, the Table 3, and the phone number, and perform anonymization processing on them.

Optionally, in this embodiment of this application, in a scenario in which the storage system loads the replica data to the anonymization environment in step 503, that the storage system performs anonymization processing on the target data may be specifically: The storage system performs anonymization processing on the target data in the anonymization environment. In this way, anonymization processing can be performed on the target data in the anonymization environment of the storage system. Compared with anonymization processing performed by another node, the anonymization processing is more convenient and flexible, and costs are reduced.

Optionally, in this embodiment of this application, in a case that the storage system determines the anonymization rule corresponding to the sensitive parameter in the target data in step 505, that the storage system performs anonymization processing on the target data may specifically include: The storage system may determine an anonymization rule corresponding to the sensitive parameter in the target data, and perform anonymization processing on the target data according to the anonymization rule, to obtain the anonymized target data.

Optionally, in this embodiment of this application, in a case that the storage system determines the anonymization rule corresponding to the preset account information in step 505, that the storage system performs anonymization processing on the target data may specifically include: The storage system determines the anonymization rule based on the target account information. For example, the storage system directly determines a corresponding anonymization rule based on the target account information, or first determines a corresponding target sensitive parameter based on the target account information, and then determines the anonymization rule based on the target sensitive parameter. Then, the storage system performs anonymization processing on the target data according to the anonymization rule, to obtain the anonymized target data.

In some embodiments, if the anonymization rule includes only the first anonymization rule, the storage system may use the first anonymization rule to perform anonymization processing on the target data in a link. The link refers to a link after the target data is obtained from the hard disk and before target data obtained through anonymization processing is sent. For example, the link may be a cache. If the anonymization rule includes only the second anonymization rule, the storage system may generate anonymization information based on the second anonymization rule, and perform anonymization processing on the target data in the hard disk by using the anonymization information. The anonymization information may include an anonymization script or an anonymization structured query statement. If the anonymization rule includes the first anonymization rule and the second anonymization rule, the storage system may perform anonymization processing on the target data in the link by using the first anonymization rule, and perform anonymization processing on the target data in the hard disk by using the second anonymization rule. In this way, the storage system supports different types of anonymization, which can meet the anonymization requirements of different accounts.

For example, it is assumed that based on the target account information: the target sensitive parameters obtained by the account A are the database A, the Table 3, and the ID card number, the storage system may search the Table 2 and determine that the anonymization rule is "Mask the date of birth". The storage system uses the anonymization rule "Mask the date of birth" to perform anonymization processing on the sensitive information listed in Table 3: the three ID card numbers. After anonymization processing, the target data shown in Table 3 is updated to that shown in Table 4.

510. The storage system sends the anonymized target data to the development node.

After the anonymized target data sent by the storage system is received, the development node may use the anonymized target data to make a business decision.

According to the data anonymization method provided in this embodiment of this application, after the data access request is obtained, the storage system can obtain the target data based on the data access request, and perform anonymization processing on the target data. Then, the storage system sends target data obtained through anonymization processing to the development node. In this way, the storage system performs anonymization processing on the stored production system data, and another host does not need to perform anonymization processing, thereby reducing costs. In addition, the storage system supports real-time anonymization and directly sends production system data obtained through anonymization processing to the development node. This reduces anonymization delay and improves anonymization efficiency.

Optionally, in this embodiment of this application, the data anonymization method may further include: The storage system obtains an access delay of the target data in the anonymization environment in real time, and adjusts a quality of service (QoS) parameter of the target data based on the access delay. The access delay is a delay from the time when the storage system receives the data access request to the time when target data obtained through anonymization processing is sent. In an embodiment, the storage system may adjust the QoS parameter of the replica data when determining that the access delay is greater than or equal to a preset delay.

The QoS parameter of the target data is adjusted in real time, so that the target data meets an anonymization requirement.

The following describes, with reference to specific examples, anonymization in the data anonymization method provided in embodiments of this application.

Figure 6:
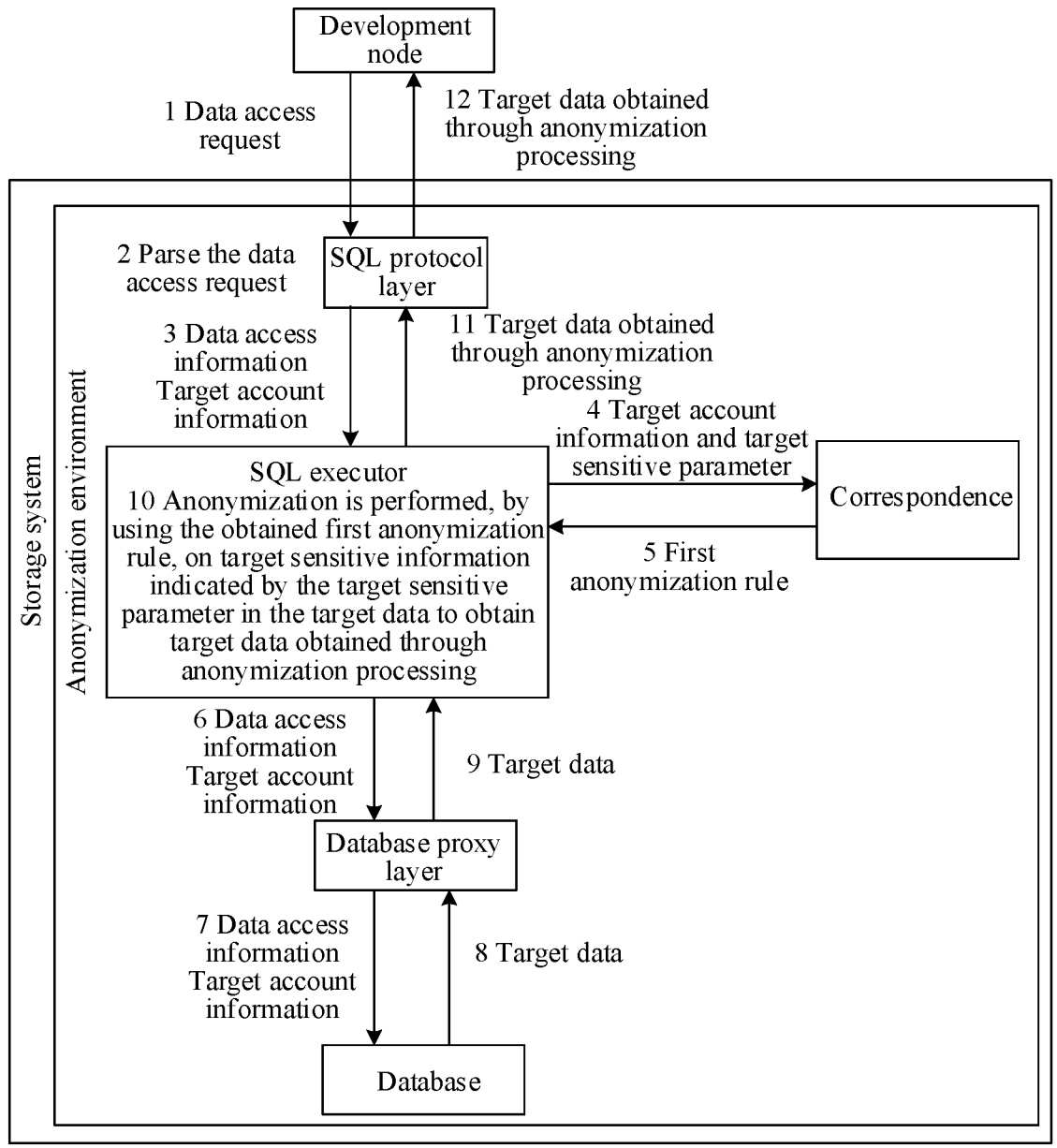
FIG. 6 is a schematic diagram of a scenario of a data anonymization method according to an embodiment of this application.

As shown in FIG. 6, the storage system includes an anonymization environment, and the anonymization environment may include an SQL protocol layer, an SQL executor, a database proxy layer, and a database.

The SQL protocol layer receives the data access request sent by the development node, and parses the data access request to obtain the data access information and the target account information that are included in the data access request. The SQL protocol layer transmits the data access information and the target account information to the SQL executor. The SQL executor obtains the sensitive parameter based on the data access information, obtains the target sensitive parameter from the sensitive parameter based on the target account information, and obtains the target anonymization rule corresponding to the target sensitive parameter. In addition, the SQL executor transmits the data access information and the target account information to the database proxy layer. The database proxy layer sends the data access information and the target account information to the database. After determining, based on the target account

TABLE 4

| Name | Height | Weight | ID card number | Phone number | Company/Organization |
|---|---|---|---|---|---|
| XX | 110 | 45 | 123456 -********- 6789 | 12345678912 | Company A |
| XX | 160 | 50 | 147258 -********- 8369 | 14725836914 | Company B |
| XX | 178 | 65 | 135792 -********- 2468 | 13579246813 | Company C | information, that the authentication succeeds, the database returns the target data corresponding to the data access information to the database proxy layer. The database proxy layer transmits the target data to the SQL executor. If the target anonymization rule is the first anonymization rule, the SQL executor performs, in the link by using the obtained first anonymization rule, anonymization on the target sensitive information indicated by the target sensitive parameter in the target data, to obtain target data obtained through anonymization processing. The SQL executor sends the target data obtained through anonymization processing to the SQL protocol layer. The SQL protocol layer sends the target data obtained through anonymization processing to the development node.

The foregoing mainly describes the solutions provided in embodiments of this application from a perspective of a method. To implement the foregoing functions, a corresponding hardware structure and/or a corresponding software module for performing each function is included. A person skilled in the art should be easily aware that, in combination with the units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
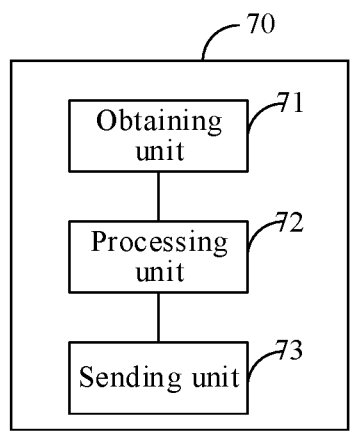
FIG. 7 is a schematic diagram 1 of a structure of a data anonymization apparatus according to an embodiment of this application.

FIG. 7 is a schematic diagram of a structure of a data anonymization apparatus 70 according to an embodiment of this application. The data anonymization apparatus 70 is configured to perform the data anonymization method shown in FIG. 5. The data anonymization apparatus 70 may include an obtaining unit 71, a processing unit 72, and a sending unit 73.

The obtaining unit 71 is configured to obtain a data access request; and obtain target data based on the data access request. For example, with reference to FIG. 5, the obtaining unit 71 may be configured to perform step 507 and step 508. The processing unit 72 is configured to perform anonymization processing on the target data obtained by the obtaining unit 71 to obtain anonymized target data. For example, with reference to FIG. 5, the processing unit 72 may be configured to perform step 509. The sending unit 73 is configured to send the target data anonymized by the processing unit 72. For example, with reference to FIG. 5, the sending unit 73 may be configured to perform step 510.

Optionally, the processing unit 72 is specifically configured to: perform anonymization processing on sensitive information in the target data based on a sensitive parameter to obtain the anonymized target data.

Figure 8:
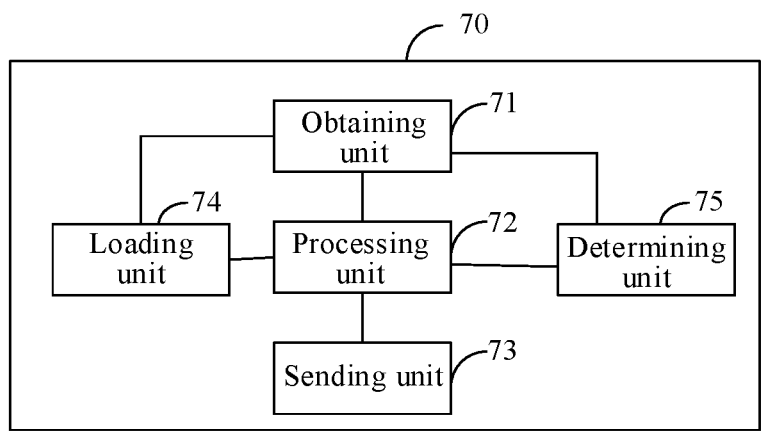
FIG. 8 is a schematic diagram 2 of a structure of a data anonymization apparatus according to an embodiment of this application.

Optionally, as shown in FIG. 8, the data anonymization apparatus 70 may further include a loading unit 74. The loading unit 74 is configured to load the target data obtained by the obtaining unit 71 to an anonymization environment. For example, with reference to FIG. 5, the loading unit 74 may be configured to perform step 503.

Optionally, the anonymization environment is a container or a virtual machine running in a storage system.

Optionally, as shown in FIG. 8, the data anonymization apparatus 70 may further include a determining unit 75. The determining unit 75 is configured to determine the sensitive parameter of the target data.

Optionally, the data access request includes target account information. The determining unit 75 is configured to determine an anonymization rule based on the target account information. The processing unit 72 is specifically configured to: perform anonymization processing on the target data according to the anonymization rule to obtain the anonymized target data.

Optionally, the determining unit 75 is specifically configured to: determine a target sensitive parameter based on the target account information, and determine the anonymization rule based on the target sensitive parameter.

Optionally, the processing unit 72 is specifically configured to: if the anonymization rule includes a first anonymization rule, perform anonymization processing on the target data in the link by using the first anonymization rule to obtain the anonymized target data. The link refers to a link after the target data is obtained from the hard disk and before the anonymized target data is sent; and if the anonymization rule includes a second anonymization rule, generate anonymization information based on the second anonymization rule, and perform, by using the anonymization information, anonymization processing on the target data in the hard disk to obtain the anonymized target data. The anonymization information includes an anonymization script or an anonymization structured query statement.

Optionally, the obtaining unit 71 is further configured to obtain an access delay of the target data. The processing unit 72 is further configured to adjust a quality of service parameter of the target data based on the access delay.

Optionally, the obtaining unit 71 is specifically configured to: when it is determined that the authentication on the target account information succeeds, obtain the target data based on the data access request.

Certainly, the data anonymization apparatus 70 provided in this embodiment of this application includes but is not limited to the foregoing modules.

Another embodiment of this application further provides a computer-readable storage medium. The computer-readable storage medium stores computer instructions. When the computer instructions are run on a storage system, the storage system is enabled to perform steps performed by the storage system in the method procedure shown in the foregoing method embodiments.

Another embodiment of this application further provides a chip system, and the chip system is applied to a storage system. The chip system includes one or more interface circuits and one or more processors. The interface circuit and the processor are interconnected through a cable. The interface circuit is configured to receive a signal from a memory of the storage system, and send the signal to the processor, where the signal includes computer instructions stored in the memory. When the processor executes the computer instructions, the storage system performs steps performed by the storage system in the method procedure shown in the foregoing method embodiment.

In another embodiment of this application, a computer program product is further provided. The computer program product includes computer instructions. When the computer instructions are run on a storage system, the storage system is enabled to perform steps performed by the storage system in the method procedure shown in the foregoing method embodiments.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer-executable instructions are loaded and executed on a computer, all or some of the processes or functions according to embodiments of this application are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application. Any variation or replacement that can be figured out by a person skilled in the art according to the specific implementations provided in this application shall fall within the protection scope of this application.

What is claimed is:

1. A data anonymization method, comprising:
obtaining, by a storage system, a data access request for target data, wherein the target data comprises sensitive information;
obtaining, by the storage system, the target data based on the data access request;
performing, by the storage system, anonymization processing on the target data to obtain anonymized target data; and
sending, by the storage system, the anonymized target data;
wherein the performing, by the storage system, anonymization processing on the target data to obtain anonymized target data comprises:
creating, by the storage system, an anonymization environment based on performance requirements of the data access request;
allocating, by the storage system, corresponding CPU and memory resources to the anonymization environment;
loading, by the storage system, the target data into the anonymization environment; and
performing, by the storage system, anonymization processing on the target data within the anonymization environment to obtain desensitized target data.

2. The data anonymization method according to claim 1, wherein the performing, by the storage system, anonymization processing on the target data to obtain anonymized target data comprises:
performing, by the storage system, anonymization processing on the sensitive information in the target data based on a sensitive parameter to obtain the anonymized target data, wherein the sensitive parameter indicates the sensitive information in the target data.

3. The data anonymization method according to claim 1, wherein before the performing, by the storage system, anonymization processing on the target data to obtain anonymized target data, the data anonymization method further comprises:
loading, by the storage system, the target data to an anonymization environment.

4. The data anonymization method according to claim 3, wherein the anonymization environment is a container or a virtual machine running in the storage system.

5. The data anonymization method according to claim 2, wherein the data anonymization method further comprises:
determining, by the storage system, the sensitive parameter of the target data.

6. The data anonymization method according to claim 1, wherein the data access request comprises target account information, and the data anonymization method further comprises:
determining, by the storage system, an anonymization rule based on the target account information; and
wherein the performing, by the storage system, anonymization processing on the target data to obtain anonymized target data comprises:
performing, by the storage system, anonymization processing on the target data according to the anonymization rule to obtain the anonymized target data.

7. A storage system, comprising:
at least one processor; and
one or more memories coupled to the at least one processor and storing programming instructions for execution by the at least one processor to:
obtain a data access request for target data, wherein the target data comprises sensitive information;
obtain the target data based on the data access request;
perform anonymization processing on the target data to obtain anonymized target data; and
send the anonymized target data;
wherein performing the anonymization processing on the target data to obtain the anonymized target data comprises:
creating an anonymization environment based on performance requirements of the data access request;
allocating corresponding CPU and memory resources to the anonymization environment;
loading the target data into the anonymization environment; and
performing anonymization processing on the target data within the anonymization environment to obtain desensitized target data.

8. The storage system according to claim 7, wherein the programming instructions are for execution by the at least one processor to perform anonymization processing on the sensitive information in the target data based on a sensitive parameter to obtain the anonymized target data, and wherein the sensitive parameter indicates the sensitive information in the target data.

9. The storage system according to claim 7, wherein the programming instructions are for execution by the at least one processor to load the target data to an anonymization environment.

10. The storage system according to claim 9, wherein the anonymization environment is a container or a virtual machine running in the storage system.

11. The storage system according to claim 8, wherein the programming instructions are for execution by the at least one processor to determine the sensitive parameter of the target data.

12. The storage system according to claim 7, wherein the data access request comprises target account information, and the programming instructions are for execution by the at least one processor to:
- determine an anonymization rule based on the target account information; and
- perform anonymization processing on the target data according to the anonymization rule to obtain the anonymized target data.

13. A non-transitory computer-readable storage medium, comprising computer instructions, wherein one or more processors in a storage system execute the computer instructions to enable the storage system to:
- obtain a data access request for target data, wherein the target data comprises sensitive information;
- obtain the target data based on the data access request;
- perform anonymization processing on the target data to obtain anonymized target data; and
- send the anonymized target data;
- wherein performing the anonymization processing on the target data to obtain the anonymized target data comprises:
  - creating an anonymization environment based on performance requirements of the data access request;
  - allocating corresponding CPU and memory resources to the anonymization environment;
  - loading the target data into the anonymization environment; and
  - performing anonymization processing on the target data within the anonymization environment to obtain desensitized target data.

14. The non-transitory computer-readable storage medium according to claim 13, wherein the one or more processors in the storage system execute the computer instructions to further enable the storage system to perform anonymization processing on the sensitive information in the target data based on a sensitive parameter to obtain the anonymized target data, and wherein the sensitive parameter indicates the sensitive information in the target data.

15. The non-transitory computer-readable storage medium according to claim 13, wherein the one or more processors in the storage system execute the computer instructions to further enable the storage system to load the target data to an anonymization environment.

16. The non-transitory computer-readable storage medium according to claim 15, wherein the anonymization environment is a container or a virtual machine running in the storage system.

17. The non-transitory computer-readable storage medium according to claim 14, wherein the one or more processors in the storage system execute the computer instructions to further enable the storage system to determine the sensitive parameter of the target data.

18. The non-transitory computer-readable storage medium according to claim 13, wherein the one or more processors in the storage system execute the computer instructions to further enable the storage system to:
- determine an anonymization rule based on target account information, wherein the data access request comprises the target account information; and
- perform anonymization processing on the target data according to the anonymization rule to obtain the anonymized target data.

19. The data anonymization method according to claim 1, wherein the target data is stored in the storage system before obtaining the data access request.

\* \* \* \* \*